United States Patent [19]

Gaglione et al.

[11] Patent Number: 5,694,392
[45] Date of Patent: Dec. 2, 1997

[54] TIMING SYSTEM FOR MOBILE CELLULAR RADIO RECEIVERS

[75] Inventors: Philippe Gaglione, Mandelieu; John Whittle, Valbonne; Bruno Bocaert, Cannes, all of France

[73] Assignee: VLSI Technology, Inc., San Jose, Calif.

[21] Appl. No.: 550,433

[22] Filed: Oct. 30, 1995

[51] Int. Cl.[6] .................. H04B 7/212; H04J 3/06
[52] U.S. Cl. .............. 370/337; 370/347; 370/503; 375/354; 455/50.1
[58] Field of Search .................. 455/49.1, 50.1, 455/67.1, 67.6, 54.1; 375/354, 355, 316; 370/313, 337, 347, 503, 516, 517, 518

[56] References Cited

U.S. PATENT DOCUMENTS

| | | | |
|---|---|---|---|
| 5,237,592 | 8/1993 | Nonami | 370/95.3 |
| 5,379,326 | 1/1995 | Nakahara et al. | 370/95.3 |
| 5,524,008 | 6/1996 | Levy | 370/95.3 |

FOREIGN PATENT DOCUMENTS

| | | |
|---|---|---|
| 0 241 565 | 10/1987 | European Pat. Off. . |
| 0 398 773 | 11/1990 | European Pat. Off. . |
| 0 474 138 | 3/1992 | European Pat. Off. . |
| 0 511 614 | 11/1992 | European Pat. Off. . |
| 0 661 836 | 7/1995 | European Pat. Off. . |

OTHER PUBLICATIONS

Michael Mouly et al., "The Pseudo–Sychronisation, A Costless Feature to Obtain the Gains of a Synchronised Cellular Network", pp. 51–55, Matra Communication, Rue JP Timbaud—B.P. 26, F–78392 Bois D'Arcy Cedex—France.

Primary Examiner—Benedict V. Safourek
Assistant Examiner—Ricky Q. Ngo
Attorney, Agent, or Firm—Burns, Doane, Swecker & Mathis LLP

[57] ABSTRACT

A hardware timing system for a cellular telephone comprises a master counter and a slave counter. The slave counter controls timing window generators in synchronism with the time frame of the local base station. The phases of timing frames of other base stations are monitored using the master counter.

10 Claims, 1 Drawing Sheet

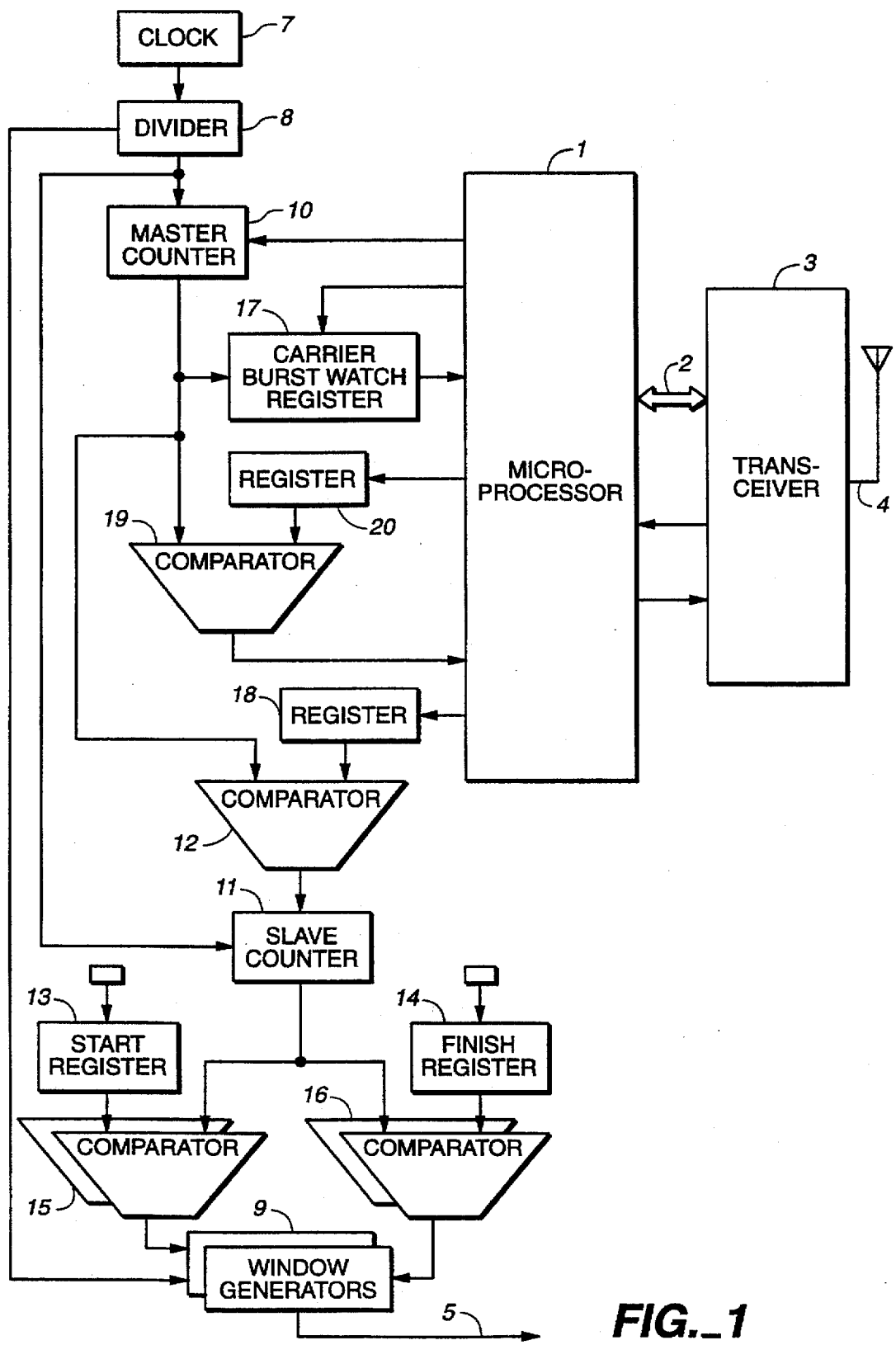
*FIG._1*

TIMING SYSTEM FOR MOBILE CELLULAR RADIO RECEIVERS

FIELD OF THE INVENTION

This invention relates to timing systems for mobile cellular radio receivers such as cellular telephones.

BACKGROUND TO THE INVENTION

Mobile cellular system receivers, such as mobile telephones, commonly include data processing circuits for controlling the reception and decoding of received signals and the encoding and transmission of signals sent to a local base station. Cellular communication systems commonly operate within a time division multiple access protocol according to which, as is well known, various operations within the cellular receiver must occur at specified points within a cyclic time frame determined by the local base station. The base station normally radiates a signal composed of a succession of frames, various time divisions within the frame being occupied by signals in a conventional or agreed format, for the purpose of synchronization and control, and other predetermined time divisions being dedicated for the conveyance of data. Commonly transmission by the receiver is assigned to a time division having some predetermined relationship with the commencement of a timing frame; usually, though not specifically essential for the present invention, the first time division or group of timing divisions within a frame is occupied by control, synchronization and data signals from the transmitting local base station.

Although the invention is not particular to any special form of time division multiple access system or any method of organizing such a system, it is a common feature of all such systems that the receiver requires its internal operations to be synchronized to the local base station. The operation of the receiver is, again, not as such fundamental to the present invention but all such receivers operating according to a time division multiple access system require operations such as detection and transmission to occur within windows of which the generation must occur at particular times within a frame that is synchronized to the time frame of the local master station.

Synchronization of a receiver to a base station for the purpose of correctly timed operation in a time division multiple access protocol is well known and does not present at the present time difficulties to those having ordinary skill in the art. However, a characteristic of cellular networks compared, for example, with a radio navigation system is that the translation of a receiver from one cell to another and therefore from co-operation with one base station to co-operation with another is a normal and frequent occurrence. Since the time frame of one local base station will differ from the time frame of other local base stations, it is desirable, and necessary according to various system protocols, to track the phases of the time frames of several, typically six, base stations which serve the cells adjacent the cell containing the base station to which a receiver is currently fully synchronized. One needs to monitor the time frames of adjacent base stations without losing the timing of the serving cell.

It is possible to monitor by means of a master counter the time frame of other adjacent cells employing some suitable means for detecting carrier signal, usually a burst of carrier signal modulated with at least control and synchronization signals, and to employ a microprocessor which is programmed to rephase the master counter on a transition between one cell and the next. However, software solutions are generally associated with a high processing overhead, high power consumption in the relevant microprocessor and increased code size.

An object of the present invention is to facilitate the tracking of the time frames of a multiplicity of cells in a cellular network while maintaining synchronizm with the time frame of a serving cell by means of an architecture, that is to say a hardware arrangement which is well adapted for incorporation into mobile cellular receivers and for programmed control yet requiring a minimum of programming effort by the microprocessor.

The basis of the invention is the use of a master counter which can monitor the time frames of adjacent cells and preferably also control the operational timing, particularly the interrupt timing, of an associated microprocessor, and a slave counter which shares the same clock as the master counter and which is employed to maintain synchronizm of the operation of the receiver in accordance with the time frame of the cell to which the receiver is or should be currently synchronized.

The two-counter architecture characteristic of the present invention can greatly simplify the task of maintaining synchronization while monitoring the time of adjacent base stations. Only the slave counter will be affected by a change, i.e. a phase change, in the time frame. The master counter and associated registers allow an easy transition from the time frame associated with one base station to the time frame pertaining to another base station. Furthermore, the architecture allows the timer to perform various other tasks, such as housekeeping tasks, without any permanent need for software attention.

Further objects of the invention are the achievement of low power consumption, lower complexity and software cost, easy synchronization with a multiplicity of time bases, excellent programmability and also easy adaptation to a wide variety of time division multiple access cellular systems.

The following description with reference to an example, explains the invention and a preferred embodiment of it in greater detail.

BRIEF DESCRIPTION OF THE DRAWING

The single FIG. 1 shows in schematic form a timing system according to the invention. The FIGURE includes schematically an associated microprocessor and signal processing circuits typical of a mobile cellular telephone.

DETAILED DESCRIPTION OF A PREFERRED EMBODIMENT

The single FIGURE illustrates for the sake of completeness only, the timing system in conjunction with a microprocessor 1, which may be on a separate integrated circuit chip, this microprocessor 1 providing timing and control signals over channels 2 to a transceiver unit 3 connected with an antenna 4.

The particular architecture and programming of the microprocessor 1 and the organisation of the transceiver 3 are of no direct consequence to the present invention. Typically, the transceiver consists of the usual voice circuits, keypad, modulator, demodulator and amplifiers typical of a mobile telephone. The processing circuits in the transceiver are controlled by various window signals, each defining the permitted start and prescribed end of some period within which an operation is to take place, these window signals being conveyed to the processing circuits over lines 5 from the timing system 6 that is the subject of the present invention and is described below in detail.

The particular operations associated with the timing windows are not directly relevant to the invention. For the purposes of the present invention, the timing system is required to provide output timing signals, normally in the form of window or timing gate signals, which occur at specified times in a repetitive time frame, synchronized to a time frame of the base station of the cell within which the telephone is currently operating.

A clock signal in the form of a stable high frequency square wave signal is generated by means of a system clock generator 7, of any convenient form. The clock signal is coupled to a clock divider 8 which divides the clock signal into stable sub-clock signals for use by window generators circuits 9 as well as a master counter 10, which is a repetitive or recycling digital counter of which the counting cycle, or modulus, is programmable by means of a set of signals coupled to the master counter from the microprocessor 1.

The modulus of the master counter 10 is preferably programmable in order to render the timing system adaptable for use with cellular communication systems having time frames of different duration.

The divided down, stable sub-clock signal from the clock divider 8 is also coupled to a slave counter 11. This counter 11 counts at the same clock rate as the master counter 10 and determines the beginning and end of each of the timing gates or windows produced by the window generators 9.

The slave counter 11 is reset to increment or decrement from a datum, the reset of the counter being determined by a signal from a comparator 12, the control of which will be described below.

The slave counter 11 acts as the controlling counter for the receiver so that the operation of the counter is synchronized to the time frame of the base station with which the mobile receiver is co-operating at any given time.

The timing windows generated by the window generators are defined in terms of counts in the slave counter and the relevant counts are inserted into start registers 13 and stop registers 14. The start registers 13 are coupled to respective comparators 15 which compare, for each start register, the signals or count value stored therein with the current count of the slave counter so as to generate a respective 'enabling' signal to a respective one of the window generators 9 in order to start the gating window. Likewise, each window generator 9 is associated with one of the comparators 16 each associated with one of the stop registers 14, the respective stop register 14 containing a digital value corresponding to the time of cessation of the respective timing window in terms of the count which should be in the counter 11 at that time. Thus, each comparator 16 compares the current count of the slave counter 11 with the value held in the respective stop register 14 and generates, on coincidence between the two compared values, an inhibit or disabling signal which terminates the timing window produced by the respective one of the window generators 9.

The particular start and stop values in the start and stop registers will be determined by the microprocessor, control and data signals being coupled to the start registers and stop registers in any convenient manner.

Although the master counter 10 provides a time frame which is equal in duration to the time frame of the cellular system, the phase of the count made by the master counter is independent of the particular phase of the time frames produced by the local base station or the base stations of adjoining cells.

The slave counter is, at any time, adapted to provide a time frame, and the timing control within that time frame, pertinent to the base station with which the receiver should be synchronized. The particular base station will have a time frame which is offset in phase from the time frame defined by the independent master counter. Thus the timing system provides means for determining that offset or phase difference, so that a signal representative of the phase difference can be stored, and updated as necessary, within the microprocessor and can be, as the mobile telephone moves from cell to cell, fed out to determine the phase relationship between the counting cycle of the slave counter 11 and the master counter 10.

The means for determining the offset need normally to be responsive to some event occurring at a predetermined phase in the time frame of a base station. In the present example, carrier burst detection is employed. The receiver circuits include, as is commonplace, means for detecting a burst of carrier signal from a base station. The conversion of a carrier burst to a corresponding enabling signal is commonplace and need not be described in detail. The microprocessor provides an enabling signal, corresponding in time to the carrier burst, to an enabling or clock input of a latch 17 herein called carrier burst watch register, which is monitoring the contents of the master counter. Thus, when the carrier burst appears (normally at the beginning of a time frame from the base station), the current content of the counter is latched and is made available to the microprocessor 1. The latched count signal value the count in the master counter at the time of the burst and thus defines the phase relationship between the base station and the master counter. There may be, as desired, means for distinguishing one carrier from another (normally by decoding the carrier signal to extract an identification signal), so that the signal representing the phase relationship is stored in a manner associated with some identification of the base station whose timing has been monitored.

The phase control of the counting cycle of the slave counter 11 is achieved by means of the comparator 12 which produces a reset signal for the slave counter on the detection of coincidence between the count in the master counter 10 and a count value held in a slave counter reset register 18, which is provided with a signal defining the resetting time from the microprocessor. The count value fed to the slave counter reset register is simply related to the value latched into the microprocessor by means of the carrier burst watch register 17.

Suppose, for example, that the signal which is detected by means of the register 17 is defined according to the system protocol to occur n clock cycles after the beginning of the time frame of the relevant base station. The carrier burst register determines, however, that the relevant signal occurs at a count of m in the master counter. Since the comparator is to be reset so that the time division corresponding to that carrier burst should be n cycles after the resetting of the slave counter, it easily follows that the value in the slave counter reset register should be m–n, of which n is measured from the carrier burst and m is defined by the system protocol and is, for example, obtainable from a storage memory controlled by the microprocessor.

In this way, the varying phase relationships between a multiplicity of nearby base stations and the independent timing provided by the master counter can be monitored, the phase relationships being stored by the microprocessor. In accordance with known practice, the decoding of received signals provide an indication of the identity of the base station with which the receiver is to be synchronized, whereupon the microprocessor can provide the relevant reset value to the reset register 18 and the comparator will reset the slave counter so that the operation of the window generators will be synchronized in accordance with the time frame of the new or selected station.

It is well known that microprocessor operation is characterised by interrupt signals. The present invention can provide microprocessor interrupts which are independent of the timing of the window generators. The count in the master counter is compared by a comparator 19 with the value in a microprocessor interrupt position register 20, programmable by means of the microprocessor, so that coincidence of the contents of this register and the current count in the master counter provides a microprocessor frame interrupt signal independent of the state of the slave counter and thereby independent of the operation and synchronization of the window generators.

Preferably the values in the start and stop registers (13,14) are double latched. First they are latched when the microprocessor writes the value, then they are transferred to the storage latches with which the comparison is made, by the rising edge of the active low microprocessor frame interrupt.

The timing frame for a cellular telephone may have nine timeslots (numbered 0 to 8). The frame structure is preferably such that the frame interrupt is normally positioned towards the end of the frame, about timeslot 6.5, so that the results of the receive timeslot (timeslot 0) and a power monitor timeslot (5) are available. There are therefore only 1.5 timeslots left for the microprocessor to set up any timing changes for the next receive slot (0). The advantage of the latching mechanism is that the software has available a whole frame in which to update timing because the new values are latched by the next interrupt.

When the frame interrupt comparison goes true the interrupt signal goes low. The microprocessor must acknowledge this interrupt by writing to a specific acknowledge register which sets the interrupt signal back high again. This rising edge latches the register values into the final stage.

The use of the rising edge gives a further adaptability in that the acknowledge can be made either before the new values are written, in which case the one-frame ahead mechanism described above operates, or it can be made after the values are written in which case the values are valid for the immediately following frame.

The frame interrupt can be inhibited for a programmed number of master counter frames. This is useful in 'Idle' mode in which the mobile receiver has to 'wake up' every few seconds to see if there is an incoming call and update its synchronisation. It avoids waking the microprocessor subsystem up every frame only for it to go back to sleep again. This saves a significant amount of power which is crucial in this mode to increase the standby time of the mobile.

The slave counter also may be turned off for the same programmed number of master counter frames as just described, in order again to save power.

We claim:

1. A timing system for a mobile receiver of a cellular communication network wherein base stations communicate with mobile receivers by means of a time division multiple access protocol defined in a repetitive time frame, the phase of the time frame being different for different ones of the base stations, said system comprising:

means for providing a system clock signal;

a master cyclic counter for counting said system clock and defining a counting cycle corresponding to said time frame;

a slave counter for counting said system clock;

a first comparator for comparing a first set count value with a count from said slave counter to provide a starting signal;

a second comparator for comparing a second set count value with a count value from said slave counter to provide a terminating signal;

means for determining a first master count value of said master counter in response to an event having a predetermined position within said time frame;

means for providing a second master count value in accordance with said first master count value and said predetermined position; and a third comparator for comparing a count of said master counter with said second master count value to reset said slave counter.

2. A timing system according to claim 1 wherein said means for determining said first master count value comprises a latch responsive to said event.

3. A timing system according to claim 1 wherein said means for providing said second master count value includes a storage register.

4. A timing system according to claim 1 and further comprising a timing window generator responsive to said starting signal and said terminating signal.

5. A timing system according to claim 1 and further comprising a fourth comparator for comparing a count in said master counter with a selectable count to generate an interrupt signal for a microprocessor.

6. A timing system for use in a time division multiple access communication system, said timing system comprising:

means for providing a system clock signal;

a master cyclic counter for counting said system clock and defining a counting cycle;

a slave counter for counting said system clock;

a plurality of timing window generating means each timing window generating means including means for comparing a first respective set count value with a count from said slave counter to provide a starting signal and means for comparing a second respective set count value with a count value from said slave counter to provide a terminating signal;

means for determining a first master count value of said master counter in response to a control signal;

means for providing a second master count value; and a comparator for comparing a count of said master counter with said second master count value to reset said slave counter.

7. A timing system according to claim 6 wherein said means for determining said first master count value comprises a latch responsive to control signal.

8. A timing system according to claim 6 wherein said means for providing said second master count value includes a storage register.

9. A timing system according to claim 6 and further comprising a second comparator for comparing a count in said master counter with a selectable count to generate an interrupt signal for a microprocessor.

10. A timing system comprising:

means for providing a system clock signal;

a master cyclic counter for counting said system clock and defining a counting cycle;

a slave counter for counting said system clock;

at least one timing window generating means each timing window generating means including means for comparing a first respective set count value with a count from said slave counter to provide a starting signal and means for comparing a second respective set count value with a count value from said slave counter to provide a terminating signal;

means for determining a first master count value of said master counter in response to a control signal;

means for providing a second master count value;

a comparator for comparing a count of said master counter with said second master count value to reset said slave counter; and a second comparator for comparing a count in said master counter with a selectable count to generate an interrupt signal for a microprocessor.

* * * * *